Jan. 7, 1969  L. A. WARNER  3,419,962
CALCULATING DEVICE
Filed Dec. 23, 1966

Inventor
Louis A. Warner
Dominik, Stein & Knechtel
Attys

United States Patent Office 3,419,962
Patented Jan. 7, 1969

3,419,962
CALCULATING DEVICE
Louis A. Warner, 5223 N. Natoma Ave.,
Chicago, Ill. 60656
Filed Dec. 23, 1966, Ser. No. 604,391
U.S. Cl. 33—111    10 Claims
Int. Cl. G01b 3/04; B43l 7/00

ABSTRACT OF THE DISCLOSURE

A micrometer scale which is formed by dividing a right triangle having the two sides thereof which form the right angle 100 inches and 1 inch long, respectively, into 10 equal length segments, each 10 inches long. These 10 segments, one of which is triangular in shape and nine of which are quadrangular in shape, are vertically aligned, in spaced relation, on a flat base and each segment is appropriately calibrated to provide measurements within a predetermined range of measurements.

---

Figures 1, 2:
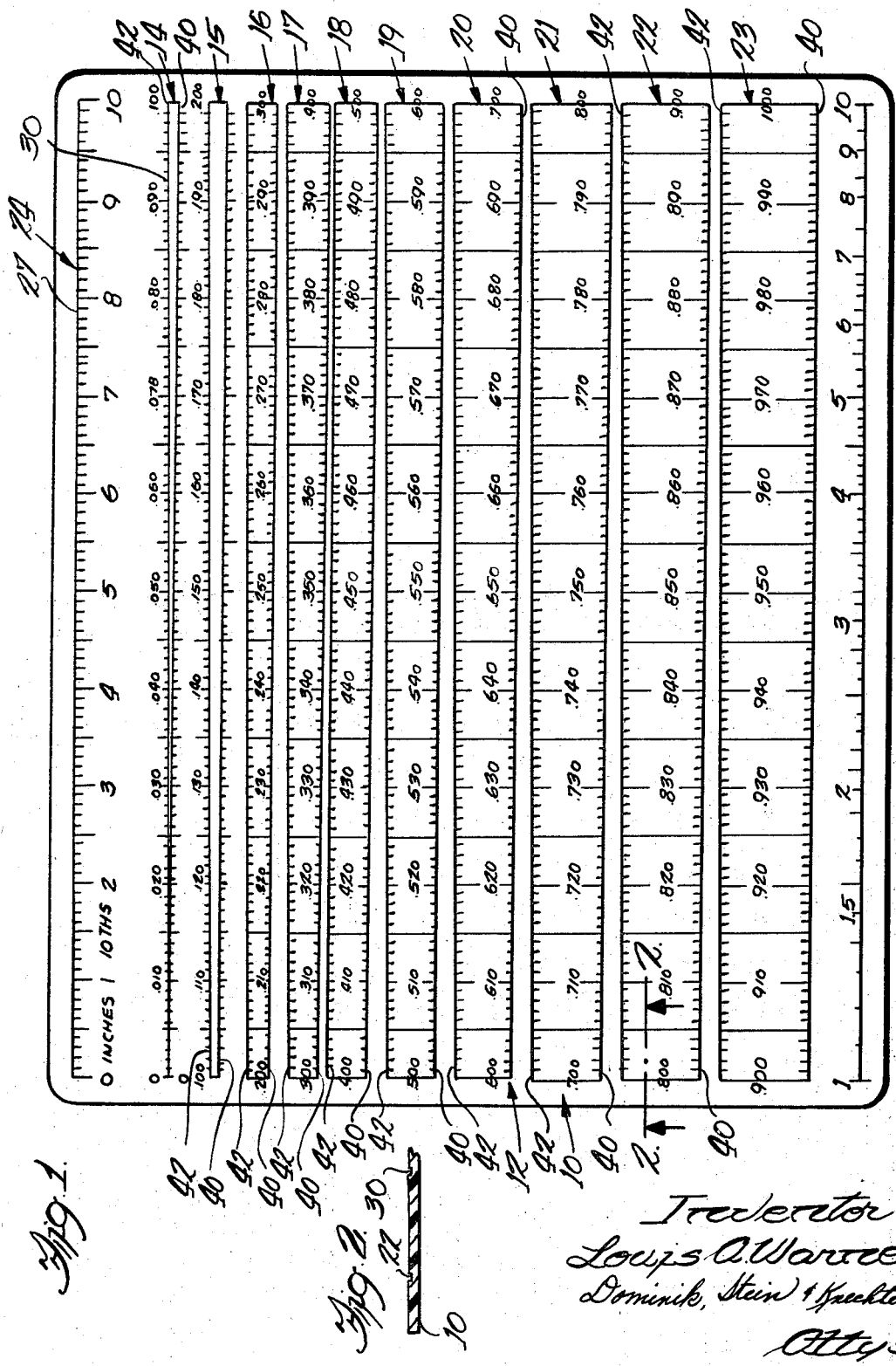

This invention relates, in general, to an improved scale and, in particular, it relates to an improved micrometer scale.

The micrometer scale of the present invention is provided by printing, etching, or engraving the scale preferably on a flat base in the form of a sheet, which base may be of paper, plastic, glass, or the like. The scale is designed and placed on the flat base in a fashion such that measurements in thousandths of an inch can be easily and quickly picked off of it. Other similar micrometer scales have been devised, however, each of them is generally unsatisfactory, for one reason or another.

For example, one such micrometer scale is disclosed in U.S. Patent 470,490, issued Mar. 8, 1892. The micrometer scale is, like that of the present invention, provided on a flat base, however, the manner in which the scale is designed and placed on the flat base makes it rather difficult to easily and quickly pick off a measurement. More specifically, the micrometer scale of the subject patent is calibrated and laid out on the base in fashion such that the portion of the scale which is used to measure a thousandth of an inch is confined within an area 10 inches long and 1 inch in width. Within this area, there are 100 vertically disposed parallel lines and 10 obliquely disposed lines which intersect one another, as well as reference characters for numbering the 100 vertically disposed parallel lines. Measurements are picked off of the micrometer scale, by selecting the intersection between one of the 100 vertically disposed parallel lines and one of the 10 obliquely disposed lines which defines the desired measurement. It can be seen that this is more easily said than done, since all of these lines and intersections are compressed within the 1 inch by 10 inch area and it is therefore relatively difficult to determine which one of the intersections is the proper one.

It is therefore an object of the present invention to provide improved scales and, in particular, improved micrometer scales.

Another object is to provide improved micrometer scales in such a physical form that a user can quickly and easily determine and select measurement up to a thousandth of an inch with the minimum likelihood of error.

Still another object is to provide improved micrometer scales which are compact in form, more accurate, and more convenient in use than those heretofore generally employed.

Still another object is to provide improved micrometer scales of the above type formed on a flat base and in a fashion such that measurements can be easily and quickly picked off of them, using dividers, calipers, and the like.

Other objects of the invention will in part be obvious and will in part appear hereinafter.

The above objectives are accomplished with a micrometer scale which is formed by dividing a right triangle having the two sides thereof which form the right angle 100 inches and 1 inch long, respectively, into 10 equal length segments, each 10 inches long. These 10 segments, one of which is triangular in shape and nine of which are quadrangular in shape, are vertically aligned, in spaced relation, on a flat base and each segment is appropriately calibrated to provide measurements within a predetermined range of measurements. An inch scale also is provided on the base to permit measurements of inches as well as thousandths of an inch to be easily and quickly picked off of the micrometer scale. A log scale can likewise be provided on the base, if desired.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which:

FIG. 1 is a top plan view of a micrometer scale exemplary of the present invention; and FIG. 2 is a sectional view, taken along lines 2—2 of FIG. 1.

Similar reference characters refer to similar parts throughout the several views of the drawing.

Referring now to the drawing, a flat base 10 is illustrated having a micrometer scale 12, formed by the triangular shaped segment 14 and the nine quadrangular-shaped segments 15–23, provided on it, which scale 12 can be easily and quickly used to provide measurements of thousandths of an inch.

The base 10 can be of substantially any type of material such as paper, plastic, glass, wood or metal, and the micrometer scale can be provided on it in any suitable fashion, as by printing or etching. An extremely accurate scale for use by engineers, tool and die makers and the like can be provided by using a metallic material having a very low coefficient of expansion for the base 10 and engraving or etching the scale 12 on it.

The segments 14–23 each correspond to a 1/10 portion of a right triangle having the two sides thereof which form the right angle 100 inches and 1 inch in length, respectively.

Accordingly, the base line 40 of each of the segments is exactly 10 inches in length. The height of the right end of the segment 23 is exactly 1 inch in length, and the right and left ends of each of the segments 14–22 is exactly 1/10 of an inch in height less than the right and left ends of the segment below it. Also, the right end of each of the segments 14–22 is exactly equal to the left end of the segment below it. The upper line 42 of each of the segments 14–23 tapers upwardly from left to right and corresponds to a 1/10 portion of the hypotenuse of the right triangle.

Each of the segments 14–23 is divided into 100 equal parts, by means of calibrations 30. Every fifth calibration is preferably substantially longer than the other calibrations and every tenth calibration is preferably appropriately indicated by a reference numeral, to simplify use of the scale 12. By a well-known geometrical principle, the distance from the base line 40 to the upper line 42 of a segment, at any calibration thereof, will be equal to the corresponding thousandths of an inch. Accordingly, any thousandths of an inch measurement is easily and quickly picked off of the micrometer scale 12 simply by locating the calibration corresponding to the desired measurement and measuring the vertical distance between the base line 40 and the upper line 42, at that calibration.

It can be seen that each of the segments 14–23 is vertically aligned on the base 10, in spaced relation and with the base lines 40 thereof parallel to one another. There is therefore little, if any, likelihood that the wrong base line 40, upper line 42 or calibration will be selected while making a measurement, for the micrometer scale 12 is laid out in extremely simple and clear fashion which is easy to read. The possibility of making any erroneous measurement can be further reduced by color-coding the base 10 and the segmenst 14–23 by, for example, coloring the base 10 one color and coloring the segments 14–23 another color or colors, so that each of the segments clearly stand out in contrast to the base 10.

When forming the micrometer scale 12 on a base 10 of a material other than sheet paper, the scale and the calibrations are preferably recessed into the base, as indicated in FIG. 2. When recessed in this fashion, the measurements can be easily and quickly picked off using dividers or calipers since the points thereof will drop into the recesses and, in this fashion, will provide an indication of their proper placement.

The utility of the micrometer scale 12 is further expanded, by providing an inch scale 24 on the base 10 so that measurements greater than 1 inch also can be easily and quickly provided. If a measurement of, for example, 5.759 inches is to be measured, one leg of the dividers is first set on the base line 40 of the segment 21, at the 759th calibration, and its other leg is set on the corresponding calibration on the upper line 42 of the same segment, to provide the 759 thousandths of an inch measurement. The 5 inches is then added by placing the two legs of the dividers on the inch scale base line 27, with one leg thereof on the 5 inch calibration and the other leg at a higher calibration, and expanding the leg initially placed on the 5 inch calibration to the 0 calibration while holding the other leg fixed.

It is therefore apparent that measurements of a thousandths of an inch as well as measurements up to 10 and 999 thousandths inches can be easily and quickly picked off of the micrometer scale 12.

It may be further noted that the design and layout of the segments 14–23 also are such that a particular thousandths calibration can be easily located. Each of the segments are read from left to right and from top to bottom, in the same fashion as the printing in a book or the like is read. Also, the reference numerals located on the opposite ends of each of the segments clearly indicate the range of values or measurements of each of the individual segments so that a measurement can be quickly located. Accordingly, the micrometer scale is compact but not cluttered as is the case with many of the prior designs, and is more accurate and convenient to use. The likelihood of error is therefore substantially, if not completely, eliminated.

A log scale 60 also can be provided along the lower edge of the base 10, if desired, which log scale can be used in conjunction with a log table to easily and quickly multiply and divide numbers using a pair of calipers or the like.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,

What is claimed is:

1. A micrometer scale comprising, in combination: a base; a triangular-shaped segment and a predetermined number of polygonal-shaped segments on said base in vertical relation, each of said polygonal-shaped segments having horizontally disposed base lines of equal lengths, a vertically disposed line at each of the opposite ends of said base lines and upper lines connecting the upper ends of said vertically disposed lines, one of said vertically disposed lines of each of said polygonal-shaped segments being proportionately related in length to one of the vertically disposed lines and equal in length to the other one of the vertically disposed lines of the polygonal-shaped segment vertically disposed above it, said triangular-shaped segment having a horizontally disposed base line of the same length as said base lines of said polygonal-shaped segments, a vertically disposed line at one end of said base line which is equal in length to the vertically disposed line at one end of the polygonal-shaped segment vertically disposed below it and an upper line connecting the upper end of said vertically disposed line with the opposite end of said base line; and a plurality of aligned calibrations of predetermined value on each of said base lines and said upper lines dividing them in a fashion such that the vertical distance between the base line and the upper line of each of said segments at each of said calibrations is equal in length to the value of said calibration.

2. The micrometer scale of claim 1 wherein said proportionately related vertically disposed lines on said polygonal-shaped segments are 1/10 inch in length less than the vertically disposed line on the polygonal-shaped segment vertically disposed below it.

3. The micrometer scale of claim 2 wherein said base lines each are exactly 10 inches in length, the longest in length vertically disposed line on any one of said polygonal-shaped segments is exactly 1 inch in length, and each of said base lines and said upper lines are calibrated into 100 equal units.

4. The micrometer scale of claim 1 wherein the vertically disposed line at one end of a polygonal-shaped segment is equal in length to the vertically disposed line at the opposite end of the polygonal-shaped segment vertically disposed below it.

5. The micrometer scale of claim 1 wherein each of said polygonal-shaped segments and said triangular-shaped segments are vertically aligned in horizontal spaced relation.

6. The micrometer scale of claim 5 wherein said base and said polygonal-shaped and triangular-shaped segments are color-coded so that said segments are visually separated from one another by contrasting colors.

7. The micrometer scale of claim 1 further including an inch scale on said base.

8. The micrometer scale of claim 1 wherein said base is formed of a flat sheet material.

9. The micrometer scale of claim 8 wherein said triangular-shaped and said polygonal-shaped segments and the calibrations thereon are recessed into said base.

10. A micrometer scale for providing measurements in thousandths of an inch formed on a base of flat sheet material, said micrometer scale comprising a right triangle having the two sides thereof which form the right angle 100 inches and 1 inch in length, respectively, said right triangle having 100 equal calibrations on the base side and on the hypotenuse thereof, respectively, which are vertically aligned, said right triangle further being divided into 10 equal length segments each 10 inches long, and said segments being applied to said base in vertically aligned spaced relation and in a fashion such that the vertical end height of one end of a segment is equal to the vertical end height of the opposite end of the segment vertically disposed below it on said base.

(References on following page)

References Cited

UNITED STATES PATENTS

| | | | |
|---|---|---|---|
| 2,352,838 | 7/1944 | Hurley | 33—103 |
| 2,595,458 | 5/1952 | Hopfeld | 33—107 |

OTHER REFERENCES

Publication of the Lufkin Rule Co., describing taper gage model S274, received Mar. 10, 1966, copy in 33/168A.

SAMUEL S. MATTHEWS, *Primary Examiner.*

U.S. Cl. X.R.

33—168